United States Patent [19]

Kennedy

[11] Patent Number: 5,186,198
[45] Date of Patent: Feb. 16, 1993

[54] INTAKE MANIFOLD RELIEF VALVE

[75] Inventor: Paul G. Kennedy, Horseheads, N.Y.

[73] Assignee: Penn Troy Maching Company, Inc., Troy, Pa.

[21] Appl. No.: 806,108

[22] Filed: Dec. 12, 1991

[51] Int. Cl.⁵ .............................................. F16K 17/04
[52] U.S. Cl. ...................................... 137/14; 137/71; 137/494
[58] Field of Search ............................ 137/14, 71, 494

[56] References Cited

U.S. PATENT DOCUMENTS

| | | |
|---|---|---|
| 3,255,774 | 6/1966 | Gallagher et al. . |
| 3,321,177 | 5/1967 | Fendel et al. . |
| 3,626,975 | 12/1971 | Bobst .................... 137/494 |
| 3,893,440 | 7/1975 | Dooley ............... 137/494 X |
| 4,109,675 | 8/1978 | Acar . |
| 4,653,527 | 3/1987 | Kosarzeck . |
| 5,050,637 | 9/1991 | Sagawa . |

*Primary Examiner*—Robert G. Nilson
*Attorney, Agent, or Firm*—Ralph R. Barnard

[57] ABSTRACT

An intake manifold relief valve comprising a valve body (13) having at least two openings, one opening being an inlet (22) for gas and another opening being an outlet (23) for gas to relieve excess pressure, a piston (8) for opening and closing said gas inlet (22) and containing an orifice hole (21) to maintain a constant pressure on both sides of the piston (8); said valve body (13) also cooperating with said piston (8) to form an enclosed gas chamber the size of which is decreased as said piston (8) moves to open said valve, a piston spring (5) applying a force on said piston (8) in addition to that provided by the gas pressure within said chamber to maintain it in a closed position under normal conditions, said piston (8) moving to open said gas inlet (22) when excess pressure within the manifold overcomes the force of said piston spring (5), thereby allowing gas to escape through said valve outlet (23); as the pressure is equalized within the valve through said orifice hole (21), said piston spring (5) will force said piston (8) back to closed position; the size of said orifice (21) being selected to determine the pressure at which the piston (8) unseats and the valve opens. The spring (5) is used to return the piston (8) to a closed position and close the valve as soon as the pressure transient has passed through the outlet (23) and the oxygen in the atmosphere entering through the exhaust opening outlet (23) cannot cause a secondary explosion in the valve.

11 Claims, 2 Drawing Sheets

INTAKE MANIFOLD RELIEF VALVE

FIELD OF INVENTION

This invention relates generally to the field of valves and more specifically to the relief of over pressurization within the intake manifolds of internal combustion engines.

BACKGROUND OF INVENTION

As a result of recent engine developments, the intake manifolds on traditionally diesel applications and other internal combustion engines have become turbo charged or pressurized with natural gas fuel mixtures. Prior to these developments, such engines had vacuums without fuel in their intakes. This recent modification creates the hazard of explosions within the intake manifold. For example, backfires from the cylinders or hot spots on the intake valves can ignite the fuel mixture in the intake. Consequently, the excess pressure within the intake manifold created by the explosion may cause damage to the engine.

SUMMARY OF INVENTION

It is an object of the present invention to provide a new and improved relief valve to protect against over pressurization within an intake manifold of an internal combustion engine during explosions.

Still another object of the present invention is to provide a new and improved method of protecting against over pressurization within an intake manifold of an internal combustion engine during explosions.

According to the present invention there is provided a new and improved intake manifold relief valve comprising a valve body having at least two openings, one opening being an inlet for gas and another opening being an outlet for gas to relieve excess pressure, a piston for opening and closing said gas inlet and containing an orifice hole to maintain a constant pressure on both sides of the piston; said valve body also cooperating with said piston to form an enclosed gas chamber the size of which is decreased as said piston moves to open said valve, a piston spring applying a force on said piston in addition to that provided by the gas pressure within said chamber to maintain it in a closed position under normal conditions, said piston moving to open said gas inlet when excess pressure within the manifold overcomes the force of said piston spring, thereby allowing gas to escape through said valve outlet; as the pressure is equalized within the valve through said orifice hole, said piston spring will force said piston back to closed position; the size of said orifice being selected to determine the pressure at which the piston unseats and the valve opens. The spring is used to return the piston to a closed position and close the valve as soon as the pressure transient has passed through the outlet and the oxygen in the atmosphere entering through the exhaust opening cannot cause a secondary explosion in the valve.

Stated another way, the teachings of the present invention provide a new and improved method of relieving an excess gas pressure wave within a system resulting from an explosive occurrence where the high pressure transient within a gas relief valve determines whether said valve is open or closed comprising the following steps. Placing the inlet of a normally closed gas relief valve in a position to sample the gas pressure in a system where a gas explosion might occur; controlling the gas relief valve so it will not open when the rate of gas pressure change within the system occurs slowly enough to equalize gas pressure between the inlet and an enclosed chamber by the use of an orifice of selected size connected therebetween; controlling the gas relief valve so that it will be driven to an open position allowing gas to flow from the inlet through and out of the valve when an explosion occurs in the system creating a high pressure transient, and to remain in an open position only so long as it takes for the pressure transient to be passed out of the system and the pressure in the inlet and the enclosed chamber is equalized through the orifice of selected size.

DESCRIPTION OF THE PREFERRED EMBODIMENT

Figure 1:
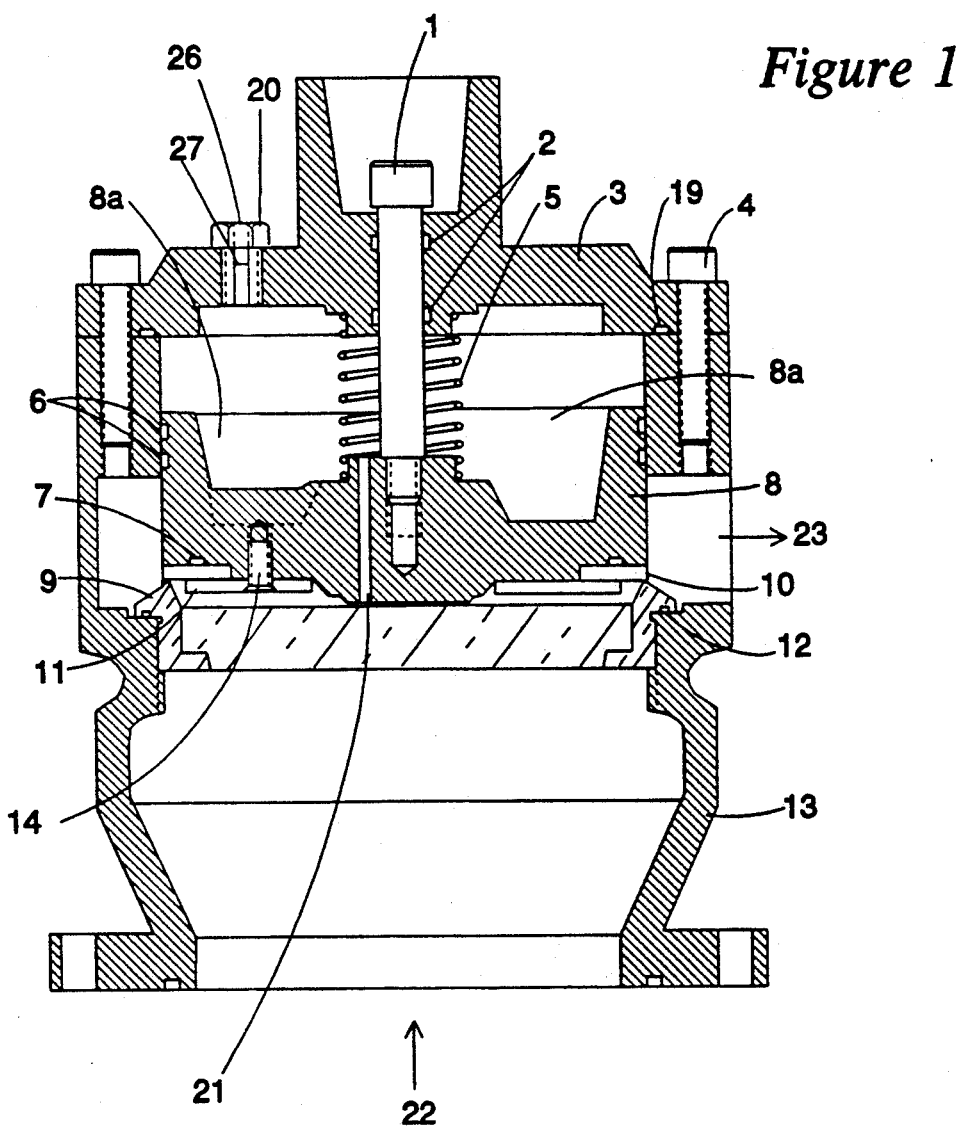
FIG. 1 is a cross section of an intake relief valve showing the valve piston in a closed position and constructed in accordance with the present invention.

Referring to FIG. 1, shown is an intake relief valve under normal conditions when a pressure transient caused by an explosion is not present in an intake manifold (or equivalent system) to which said valve is attached. The valve includes a body (13) having an opening at one extremity. Said opening being an inlet (22) for gas for passage to the outlet (23) and said passage being closed under normal conditions as illustrated. Said outlet (23) being located on said valve body and serving as an opening through which to relieve excess gas pressure.

A piston (8) including a skirt (8a) serves as a close off disc between said gas inlet (22) and said gas outlet (23) preventing gasses within the manifold from escaping through said valve when excess pressure does not exist within the manifold. With the aide of an attached piston seat (10), the piston (8) rests against a seat ring (9) while in a closed position blocking the passage between said inlet (22) and said outlet (23). Shown attached to the seat ring (9) is a cross section of a bar which is part of a radial support system thereof. Such a support system may be used to attach a flame arrestor to the valve. Such a support system may not necessary in all cases. It should also be made clear that the support system does not interfere with the effect of pressure on the inlet side of the piston (8). The connection of said piston seat (10) to said piston (8) is reinforced through the use of seat seals (7) which help to prevent the leakage of gasses from the valve. A seat retainer (11) also helps to hold the piston seat (10) to the piston (8), and is connected to said piston (8) through the use of retainer bolts (14). In the present invention, three retainer bolts (14) are utilized, and the place on the piston (8) where the bolts (14) are located is ribbed to provide sufficient area for the bolts (14) to be inserted.

An annular cavity within the valve surrounds the circumference of said piston and serves as a passage connecting said inlet (22) and said outlet (23). The gas outlet (23) is an opening of said annular cavity to the atmosphere or outside of the valve. Such a cavity provides a large relief area for the fast release of gas out of the valve, thereby exhausting the potential of an explosion quickly. More than one opening may exist in the annular cavity allowing for multiple gas outlets.

The opening of said gas inlet (22) is located through said seat ring (9) which in turn is connected to the valve body (13). A seat ring seal (12) located between the seat ring (9) and said valve body (13) also prevents the leakage of gasses from said valve.

The inlet side of said piston (8) is exposed to pressure within the intake manifold while the other side of said piston (8) forms an enclosed chamber with the wall of said valve body (13) and cover (3). In its steady state condition of not being subjected to pressure waves due to rapid combustion, the piston (8) is maintained against the seat ring (9) by the larger net force created by the fact that the area in the enclosed chamber side of the piston (8) is greater than the area formed on the inlet side of the valve determined by the diameter of the seat ring (9).

A piston guide bolt (1) passing through the valve cover (3) is connected to the center of said piston (8) and serves to guide the piston as it moves to open and close said gas inlet (22). To prevent the leakage of gas from said enclosed chamber, guide bolt seals (2) are placed between said guide bolt (1) and the valve cover (3).

The valve cover (3) is attached to said valve body (13) by cover bolts (4). Cover seals (19) are also utilized to prevent the leakage of gas from the enclosed chamber.

A piston spring (5) located on said guide bolt (1) serves to apply a force on the piston (8) in addition to that applied by the gas pressure in the enclosed chamber to maintain said piston (8) in a closed position. Additionally, said piston spring (5) helps to keep the piston (8) in a closed position while the engine incorporating the valve is starting. Piston seals (6) within said chamber are used to assist the piston (8) in remaining closed by preventing the leakage of gas within said chamber to maintain the gas pressure therein.

When an explosion occurs within said intake manifold, the pressure on the inlet side of the piston (8) is greater than the pressure on the chamber side of said piston. This forces the piston (8) away from the seat ring (9) to open said gas inlet (22) and contract said enclosed chamber, allowing gas to escape from the manifold through the gas outlet (23). The pressure will then be equalized on both sides of the piston (8) over time through an orifice hole (21) within the piston. Said orifice hole (21) also helps to maintain a constant pressure on both sides of the piston (8), and relieve long time pressure changes occurring in the manifold when the piston is in a closed position. Therefore, the cross section of said orifice hole (21) is selected to determine the pressure at which the piston (8) unseats and opens the valve. The size of said orifice hole is critical in determining what magnitude and rate of gas pressure change within the system will cause the valve to open. When the change occurs slowly enough for the orifice hole (21) to equalize the pressure between the inlet (22) and the enclosed chamber, the valve will remain closed. However, when the orifice hole (21) cannot deliver excess pressure to the enclosed chamber as fast as it builds up on the inlet side of the valve, the piston (8) will unseat and open the valve allowing the excess pressure to be released through the valve outlet (23). Clearly, the larger the cross sectional area of the orifice (21), the faster the pressure may be equalized between the chamber and inlet side of the piston (8). Therefore, the magnitude and rate of pressure change at which the valve opens varies with the size of said orifice (21). The spring (5) is used to return the piston (8) to a closed position and close the valve as soon as the pressure transient has passed through the outlet (23) and the oxygen in the atmosphere entering through the exhaust opening outlet (23) cannot cause a secondary explosion in the valve.

Intake manifolds normally run under a pressure of approximately 15 psi. In cases when the chamber side and inlet side of the piston (8) both build up in pressure over a period of time to a point beyond normal, a relief rupture head (20) located in the valve cover (3) will burst. This may occur during a long term explosion as pressure is continuously delivered to the enclosed chamber creating excess pressure therein amounting to approximately 30 psi or more. As a result, the chamber will be relieved of pressure faster than the inlet side of the piston (8). The valve will then open, relieving the excess pressure within the manifold, until pressure on the inlet side of the piston (8) is low enough for the piston spring (5) to overcome and force the piston (8) shut. The rupture head (20) is a commercially available item which is commonly used for valves in pressurized systems. It comprises a diaphragm (27) which ruptures when subjected to a certain pressure level and an orifice hole (26) through the valve cover (3) through which to relieve the excess pressure.

Figure 2:
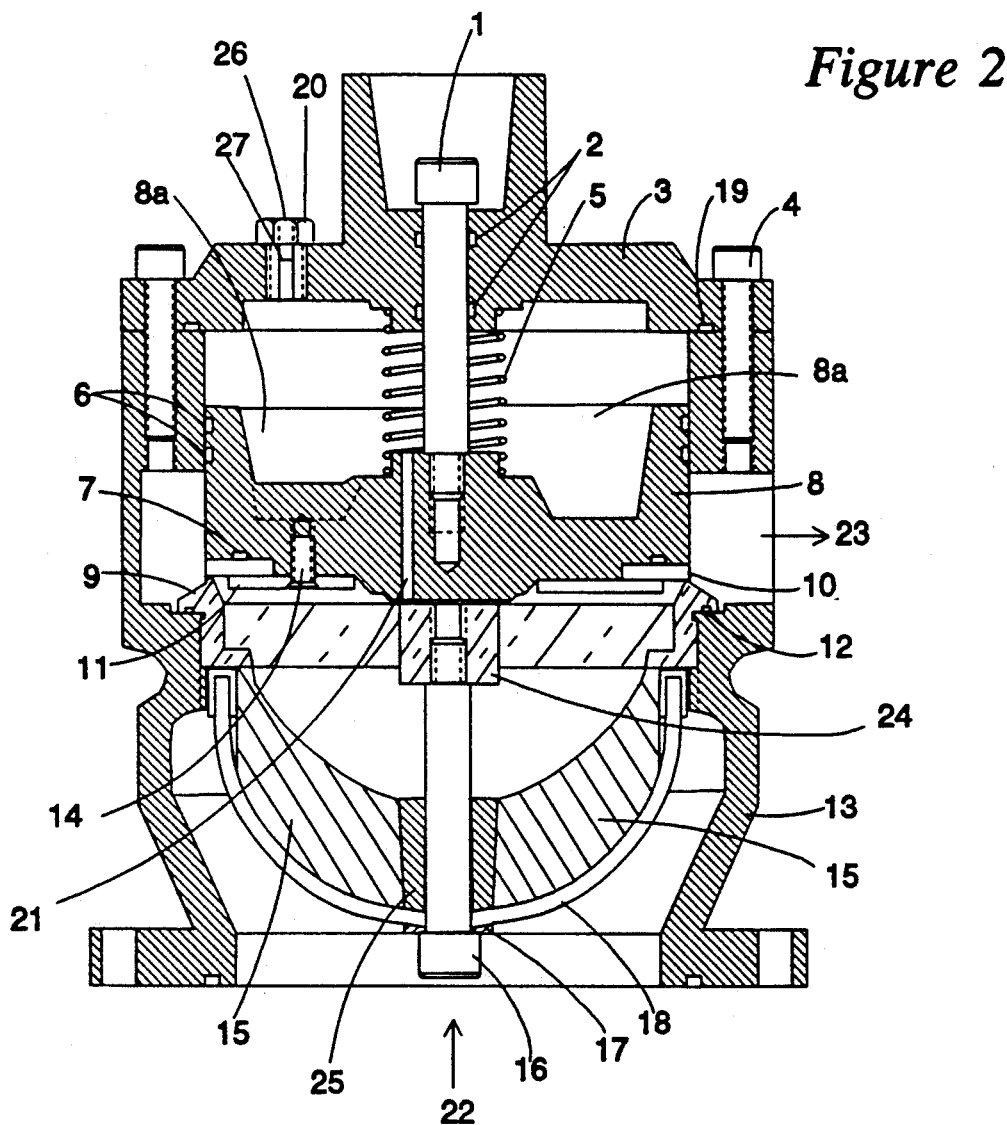
FIG. 2 is a cross section of an intake relief valve showing the valve piston in a closed position and incorporating a gauze assembly flame arrestor in the valve inlet.

As indicated in FIG. 2, a gauze assembly (18) may be placed within the inlet cavity of the valve to prevent flames caused by an explosion from passing through said valve inlet (22) while allowing gaseous mixtures to enter the valve. During an explosion a spider (15) prevents the gauze assembly from collapsing by serving as a frame. Said spider (15) is connected to a boss (25) and attached to said gauze assembly by a spider bolt (16) and washer (17). The seat ring (9) includes four radially arranged bars. A second boss (24), is attached to the center of said bars and acts to anchor said spider bolt (16). Due to its location, this boss (24) also prevents unwanted material which may enter the valve from passing through the orifice hole (21) within said piston (8) while continuing to allow gas to pass through said orifice (21).

Thus in the operation of said intake valve (FIGS. 1 and 2), the piston (8) acts to seal off the valve inlet (22) when there is insufficient pressure on the inlet side of the piston (8) to overcome the gas pressure and force of said spring (5) on the chamber side of the piston in urging it to a closed position. However, when an explosion occurs and the orifice hole (21) cannot deliver pressure to said valve chamber as fast as it builds up on the inlet side of the piston (8), the piston will move against the spring (5) and open said gas inlet (22) allowing pressure to be relieved from the intake manifold through said gas outlet (23). As the pressure equalizes on both sides of the piston (8) through the orifice hole (21), the spring (5) will once again overcome the pressure on the inlet side of the piston and force the gas inlet (22) closed.

The teachings of the present invention provide a new and improved method of relieving an excess gas pressure wave within a system resulting from an explosive occurrence where the high pressure transient within a gas relief valve determines whether said valve is open or closed comprising the following steps. Placing the inlet (22) of a normally closed gas relief valve in a position to sample the gas pressure in a system where a gas explosion might occur; controlling the gas relief valve so it will not open when the rate of gas pressure change within the system occurs slowly enough to equalize gas pressure between the inlet (22) and an enclosed chamber by the use of an orifice (21) of selected size connected therebetween; controlling the gas relief valve so that it will be driven to an open position allowing gas to flow from the inlet (22) through and out of the valve when an explosion occurs in the system creating a high pressure transient, and to remain in an open position only so long as it takes for the pressure transient to be passed out of the system and the pressure in the inlet (22) and the enclosed chamber is equalized through the orifice (21) of selected size.

Referring to the FIG. 1 placing the inlet (22) of a normally closed gas relief valve in a position to sample the gas pressure in a system where a gas explosion might occur is accomplished by connecting the inlet side of said valve body (13) to a pressurized system such as an intake manifold. By maintaining an applied force on said piston (8) through the use of a piston spring (5) and gas pressure within said enclosed chamber, the gas relief valve is controlled so it will not open when the rate of gas pressure change within the system occurs slowly enough to equalize gas pressure between the inlet (22) and said enclosed chamber by the use of an orifice (21) of selected size connected therebetween. When an explosion occurs in the system creating a high pressure transient, the gas relief valve is controlled so that it will be driven to an open position allowing gas to flow from the inlet (22) through and out of the valve by overcoming the force on the piston (8) within said enclosed chamber and moving said piston away from the inlet (22). The movement of the piston (8) is guided by the attached guide bolt (1). Said valve is allowed to remain in an open position only so long as it takes for the pressure transient to be passed out of the system by equalizing the pressure between said inlet (22) and the enclosed chamber through the orifice (21) and forcing the piston (8) to a closed position by the force of the piston spring (5) and gas pressure within said enclosed chamber.

The foregoing description has been directed to particular embodiments of the invention in accordance with the requirements of the Patent Statutes for the purposes of illustration and explanation. It will be apparent, however, to those skilled in this art that many modifications and changes will be possible without departure from the scope and spirit of the invention. It is intended that the following claims be interpreted to embrace all such modifications.

I claim:

1. A valve for the relief of gas over pressurization in an intake manifold comprising:
   (a) a valve body having at least two openings; one opening located at one extremity of said body and being an inlet connected to receive gas from intake manifold and another opening located on said body being an outlet for gas to relieve excess pressure;
   (b) a piston for opening and closing the passage between said gas inlet and said gas outlet, and containing an orifice to maintain a constant pressure on both sides of the piston;
   (c) said valve body also cooperating with said piston to form an enclosed gas chamber the size of which is decreased as said piston moves to open said valve;
   (d) a piston spring applying a force on said piston to maintain it in a closed position under normal conditions;
   (e) said piston moving to open said gas inlet when excess gas pressure within the manifold overcomes the force of said piston spring, thereby allowing gas to escape through said valve outlet; as the pressure is equalized within the valve through said orifice hole, said piston spring will force said piston back to closed position;
   (f) the size of said orifice being selected to determine the pressure at which the piston unseats and the valve opens.
   (g) said orifice hole relieving minor pressure waves within said intake manifold when said piston is in a closed position by delivering excess gas pressure to the chamber side of the piston.

2. The valve for the relief of gas over pressurization as set forth in claim 1 further comprising:
   (a) a piston guide bolt connected perpendicularly to center of said piston and within said enclosed chamber, and serving to guide the piston as it moves to open and close said inlet;
   (b) a seat ring against which said piston rests in a closed position to seal off said inlet; the cross sectional area of said seat ring being less than the cross sectional area of said piston and enclosed chamber such that the piston rests against the seat ring at all times except when said piston is driven away from that position thereby opening the valve in response to relatively high and short time pressure transients due to combustion in the intake manifold;
   (c) the piston being maintained against the seat ring by the larger net force created by the fact that the area in the enclosed chamber side of the piston is greater than the area formed on the inlet side of the valve determined by the diameter of said seat ring when the valve is in a steady state condition of not being subjected to pressure waves due to explosive occurrences;
   (d) a piston spring on said guide bolt applying a force on said piston in addition to the force applied thereon by the gas pressure in the enclosed chamber to maintain said piston in a closed position; said gas pressure being that maintained through the orifice from the inlet side of the piston.

3. The valve for the relief of gas over pressurization as set forth in claim 2 further including a flame arrestor within said valve inlet comprising:
   (a) a gauze assembly to prevent flames from passing through inlet while allowing gaseous mixtures to enter valve;
   (b) a spider serving as a frame within said gauze assembly to prevent it from collapsing during an explosion.

4. The valve for the relief of gas over pressurization as set forth in claim 1 further comprising:
   (a) a relief rupture head located in the valve cover which bursts to lessen pressure within the valve when both sides of the piston build up in pressure to a point beyond normal.

5. The valve for the relief of gas over pressurization as set forth in claim 1 further comprising:
   (a) piston seals within said chamber to assist said piston in remaining in a closed position;
   (b) a piston seat attached to said piston resting against said seat ring while said piston is in a closed position.

6. A method of relieving an excess gas pressure wave within a system resulting from an explosive occurrence where the high pressure transient within a gas relief valve determines whether said valve is open or closed comprising the following steps:
   (a) placing the inlet of a normally closed gas relief valve in a position to sample the gas pressure in a system where a gas explosion might occur;
   (b) controlling the gas relief valve so it will not open when the rate of gas pressure change within the system occurs slowly enough to equalize gas pressure between the inlet and an enclosed chamber by the use of an orifice of selected size connected therebetween
   (c) controlling the gas relief valve so that it will be driven to an open position allowing gas to flow from the inlet through and out of the valve when an explosion occurs in the system creating a high pressure transient, and to remain in an open position only so long as it takes for the pressure transient to be passed out of the system and the pressure in the inlet and the enclosed chamber is equalized through the orifice of selected size.

7. The method of claim 6 for relieving an excess gas pressure wave within a system resulting from an explosive occurrence where the high pressure transient within a gas relief valve determines whether said valve is open or closed further comprising the rupturing open of a relief rupture means within the enclosed chamber to prevent abnormally high pressure gas from accumulating in said enclosed chamber of the valve.

8. A means of relieving an excess gas pressure wave in a intake manifold system resulting from an explosive occurrence where the high pressure within a gas relief valve determines whether said valve is open or closed comprising:
   (a) a gas relief valve means having a valve body means in an inlet and an outlet;
   (b) a piston means;
   (c) means for forming an enclosed chamber within said valve body means through the cooperation of said valve body means and said piston means therein having an inlet side and a chamber side, with said inlet side of said piston means being exposed to the gas pressure within said system and the inlet side of the valve means and the size of said chamber contracting as said piston means moves to open said valve;
   (d) means for maintaining said piston in a position which closes said valve by providing a larger pressurized area on piston surface within said chamber than the pressurized area on the surface of the inlet side of said piston;
   (e) a piston spring means within said chamber applying a additional force on said piston to close said valve means;
   (f) means for maintaining gas pressure within said chamber through an orifice hole within the piston means which connects the inlet side and the chamber side of said piston means except when said inlet side of the piston means is being subjected to transient gas pressure waves from explosive occurrences; and
   (g) said piston moving to open said valve means when the gas pressure on the inlet side of said valve means exceeds the pressure within the said enclosed chamber allowing high pressure gas to pass out through the outlet of said valve means and relieve said intake manifold system of over pressurization.

9. A means of relieving excess gas pressure within an intake manifold where the means as set forth in claim 8 includes the following additional means:
   (a) means within said piston spring means for perpendicularly connecting a guide bolt to the center of said piston means to guide movement of the piston to an open or closed position; and
   (b) said orifice hole means through said piston for releasing minor pressure waves and maintaining a constant pressure on both sides of said piston being selected in cross section to determine the pressure as which the piston unseats to its open position.

10. A means for relieving excess pressure within an intake manifold where the means as set forth in claim 8 includes the following additional means:
   (a) gauze assembly means in the inlet of said valve body preventing flames from passing through said gas inlet while allowing gaseous mixtures to enter said valve; and
   (b) a relief rupture head means located in the valve body means within its enclosed chamber for relieving over pressurization within the valve when both sides of the piston build up in pressure to a point beyond normal for said enclosed chamber for bursting.

11. A means for relieving an excess gas pressure wave in a system resulting from an explosive occurrence where the high pressure within a gas relief valve determines whether said valve is open or closed comprising:
   (a) a gas relief valve means having a valve body means in an inlet and an outlet;
   (b) a piston means;
   (c) means for forming an enclosed chamber within said valve body means through the cooperation of said valve body means and said piston means therein having an inlet side and a chamber side, with said inlet side of said piston means being exposed to the gas pressure within said system and the inlet side of the valve means and the size of said chamber contracting as said piston means moves to open said valve;
   (d) means for maintaining said piston in a position which closes said valve by providing a larger pressurized area on piston surface within said chamber than the pressurized area on the surface of the inlet side of said piston;
   (e) a piston spring means within said chamber applying a additional force on said piston to close said valve means;
   (f) means for maintaining gas pressure within said chamber through an orifice hole within the piston means which connects the inlet side and the chamber side of said piston means except when said inlet side of the piston means is being subjected to transient gas pressure waves from explosive occurrences; and
   (g) said piston moving to open said valve means when the gas pressure on the inlet side of said valve means exceeds the pressure within the said enclosed chamber allowing high pressure gas to pass out through the outlet of said valve means and relieve said system of over pressurization.

* * * * *